(12) United States Patent
Su et al.

(10) Patent No.: US 6,899,438 B2
(45) Date of Patent: May 31, 2005

(54) VEHICULAR REARVIEW MIRROR HAVING COMPOSITE HOUSING STRUCTURE

(75) Inventors: Wen-Wei Su, Hsinchu (TW); Kuei-Hung Chen, Taipei (TW)

(73) Assignee: EXON SCIENCE, Inc., Taoyuan (TW)

( * ) Notice: Subject to any disclaimer, the term of this patent is extended or adjusted under 35 U.S.C. 154(b) by 57 days.

(21) Appl. No.: 10/431,525

(22) Filed: May 8, 2003

(65) Prior Publication Data

US 2004/0223239 A1 Nov. 11, 2004

(51) Int. Cl.$^7$ ................................................ G02B 7/18
(52) U.S. Cl. ........................ 359/844; 359/871; 362/494
(58) Field of Search ................................. 359/839, 838, 359/844, 868, 871, 601, 602, 603, 604, 605, 606, 607, 608, 883, 265, 514, 872; 362/494

(56) References Cited

U.S. PATENT DOCUMENTS

| | | | | |
|---|---|---|---|---|
| 3,713,726 A | * | 1/1973 | Magi ........................... | 359/871 |
| 3,734,447 A | * | 5/1973 | Perison, Sr. .................. | 248/481 |
| 3,918,799 A | * | 11/1975 | Kurz et al. ................... | 359/871 |
| 5,133,141 A | | 7/1992 | Bane ............................ | 40/593 |
| 5,151,824 A | * | 9/1992 | O'Farrell ..................... | 359/604 |
| 5,210,655 A | | 5/1993 | Mishali ........................ | 359/850 |
| 5,986,364 A | * | 11/1999 | Bingle et al. .................. | 310/51 |
| 6,218,934 B1 | * | 4/2001 | Regan .......................... | 340/438 |
| 6,494,602 B2 | | 12/2002 | Pastrick ....................... | 362/494 |
| 6,520,667 B1 | | 2/2003 | Mousseau .................... | 362/494 |

FOREIGN PATENT DOCUMENTS

| | | | |
|---|---|---|---|
| DE | 1177023 | 8/1964 | |
| EP | 0 496 155 A2 | 7/1992 | |
| FR | 2 080 055 | 11/1971 | |
| GB | 782895 | 9/1957 | |
| GB | 1095331 | 12/1967 | |
| GB | 1120517 | 7/1968 | |
| JP | 2002137685 A | * 5/2002 | ............. B60R/1/06 |

* cited by examiner

*Primary Examiner*—Thong Nguyen
*Assistant Examiner*—Arnel C. Lavarias
(74) *Attorney, Agent, or Firm*—Bacon & Thomas

(57) ABSTRACT

A vehicular rearview mirror includes a mirror for showing thereon an image; a first housing structure made of a first material, and accommodating therein the mirror with a portion of the mirror exposed to show the image; and a second housing structure made of a second material, and disposed between and keeping in contact with the first housing structure and the exposed portion of the mirror. The second material has a flexibility higher than that of the first material.

22 Claims, 8 Drawing Sheets

VEHICULAR REARVIEW MIRROR HAVING COMPOSITE HOUSING STRUCTURE

FIELD OF THE INVENTION

The present invention relates to a vehicular rearview mirror, and more particular to a vehicular rearview mirror having a composite housing structure.

BACKGROUND OF THE INVENTION

Please refer to FIGS. 1A and 1B which are a perspective and a resolving diagrams schematically showing a conventional structure of a conventional vehicular interior rearview mirror. The rearview mirror includes a front housing 11, a rear housing 12, and a mirror 13 disposed between the front and the rear housings 11 and 12. The front and the rear housings 11 and 12 are conventionally made of a rigid plastic material such as polycarbonate (PC) or acrylonitrile-butadiene-styrene (ABS) resin for securing therebetween the mirror 13. As is known, due to both of the front housing 11 and the mirror 13 are inflexible, it is almost impossible for them to be in very close conjunction with each other. In other words, there is a certain level of gap existing between the housing 11 and the mirror 13. Therefore, the impact tolerance of the mirror 13 is adversely affected. Further, when a driver is seated in a vehicle, the interior rearview mirror has to be adjusted in order to have a proper view range from the mirror 13 while driving. The frequent manipulation of the rigid mirror housing 11, 12 would distort the mirror to some extent. The above-mentioned problems are even more serious when the housing material is aged due to long term exposure in the sunlight.

Compared to the interior rearview mirror that is generally planar, an exterior rearview mirror even more significantly suffers from the gap existing between the housing 11 and the mirror 13 due to its convex or aspheric (i.e. multi-radius) feature. As is known to those skilled in the art, it is relatively difficult to combine the housing with the non-planar mirror tightly.

SUMMARY OF THE INVENTION

Therefore, an object of the present invention is to provide a housing structure of a vehicular rearview mirror, which is rigid enough for securing the mirror therein and subject to close conjunction with the mirror.

According to a first aspect of the present invention, a vehicular rearview mirror comprises a mirror for showing thereon an image; a first housing structure made of a first material, and accommodating therein the mirror with a portion of the mirror exposed to show the image; and a second housing structure made of a second material, and disposed between and keeping in contact with the first housing structure and the exposed portion of the mirror. The second material has a flexibility higher than that of the first material.

Preferably, the first housing structure includes a front piece and a rear piece combined with each other to hold the mirror therein.

Preferably, the front piece is of a ring shape for exposing the portion of the mirror, and the second housing structure is of a ring shape in conjunction with the front piece of the ring shape.

Preferably, the rear piece is disposed therein a plurality of buffering posts for sustaining against the mirror to secure the mirror in the first housing structure.

In an embodiment, the second housing structure has a slot on an outer circumference thereof for partially receiving the front piece, and a curved portion on an inner circumference thereof for close contact with the portion of the mirror.

In another embodiment, the second housing structure is formed by injection molding to the front piece.

Preferably, the second material is selected from a group consisting of rubber and resin, e.g. natural rubber, silicone rubber and epoxy resin.

Preferably, the first material is selected from a group consisting of engineering plastic, metallic material, carbon fiber and wood. The engineering plastic is, for example, nylon preferably incorporated therein a proper content of glass fiber, polybutylene terephthalate (PBT), polycarbonate (PC), acrylonitrile-butadiene-styrene (ABS), high-impact polystyrene (Hi-PS), polypropylene (PP), liquid crystal polymer (LCP), polyethylene (PE) and polystyrene (PS). The metallic material, for example, is a metal or an alloy such as magnesium alloy.

The mirror, for example, can be a partially reflective mirror, an electrochromic mirror or a liquid crystal display. On the other hand, the mirror can have a planar, convex or aspheric shape. Preferably, the mirror is combined therewith a thin film display such as a thin-film electro-luminescence (EL) digit display, a light-emitting diode (LED), an organic light-emitting diode (OLED), a liquid crystal display (LCD) or a vacuum fluorescent display (VFD).

According to a second aspect of the present invention, a vehicular rearview mirror comprises a mirror for showing thereon an image; a rear housing structure having an opening for receiving therefrom the mirror; and a front housing structure combined with the rear housing structure to confine the mirror therebetween, and including an outer hollow portion in conjunction with the rear housing made of a first material and an inner hollow portion in contact with the mirror made of a second material, the second material having a flexibility higher than that of the first material.

Preferably, the rear housing is also made of the first material, which for example, can be plastic metallic material, carbon fiber or wood.

Preferably, the rear housing structure includes a plurality of buffering posts urging the mirror to sustain against the front housing to securely confine the mirror when the front housing structure is combined with the rear housing structure.

The second material can be selected from a group consisting of rubber, resin and any other suitable elastomeric material. For example, the second material is selected from a group consisting of natural rubber, silicone rubber and epoxy resin.

Preferably, the inner hollow portion has a slot on an outer circumference thereof for engaging with an inner circumferential edge of the outer hollow portion. More preferably, the inner hollow portion has a curved portion on an inner circumference thereof bent toward the mirror for close contact with the mirror.

Alternatively, the inner hollow portion is formed by injection molding to the outer hollow portion.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
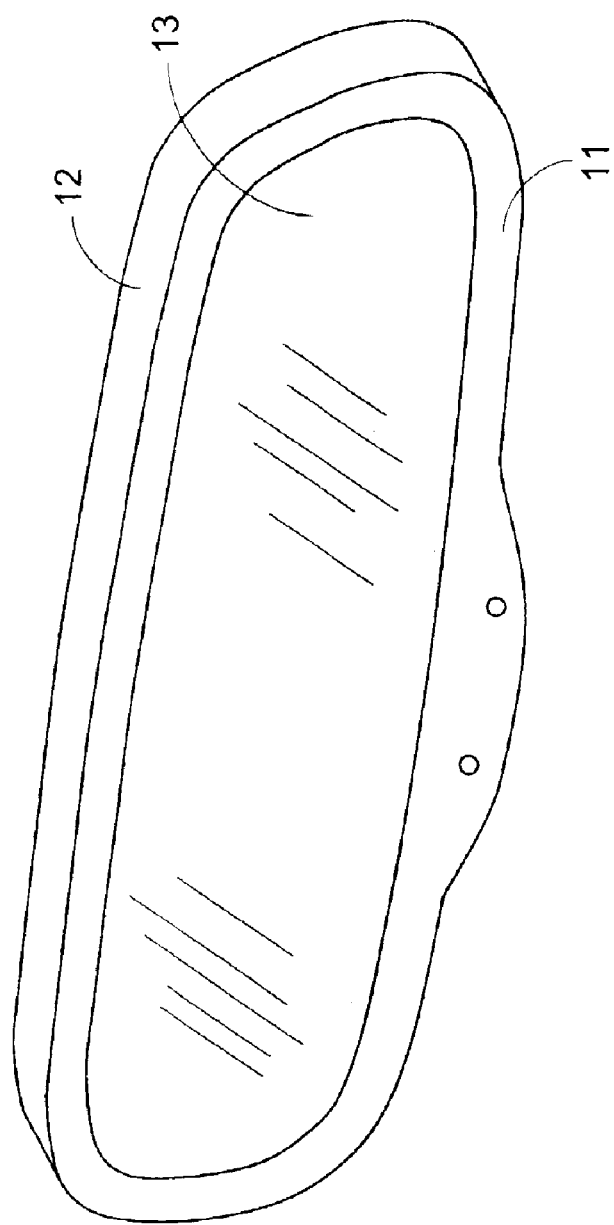
FIG. 1A is a perspective diagram schematically showing a conventional structure of a conventional vehicular interior rearview mirror.
Figure 1B:
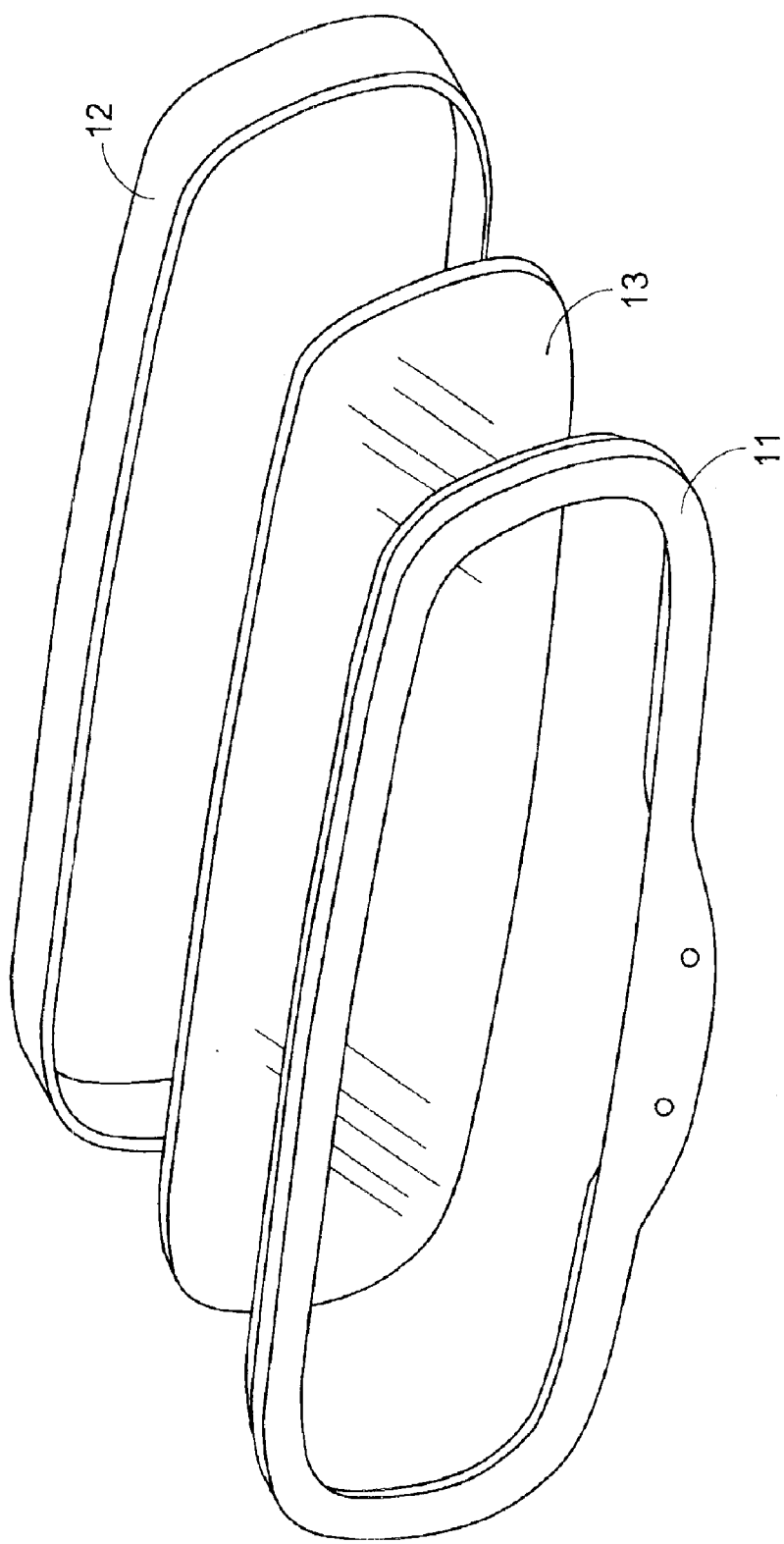
FIG. 1B is a resolving diagram of the rearview mirror structure of FIG. 1A.
Figure 2A:
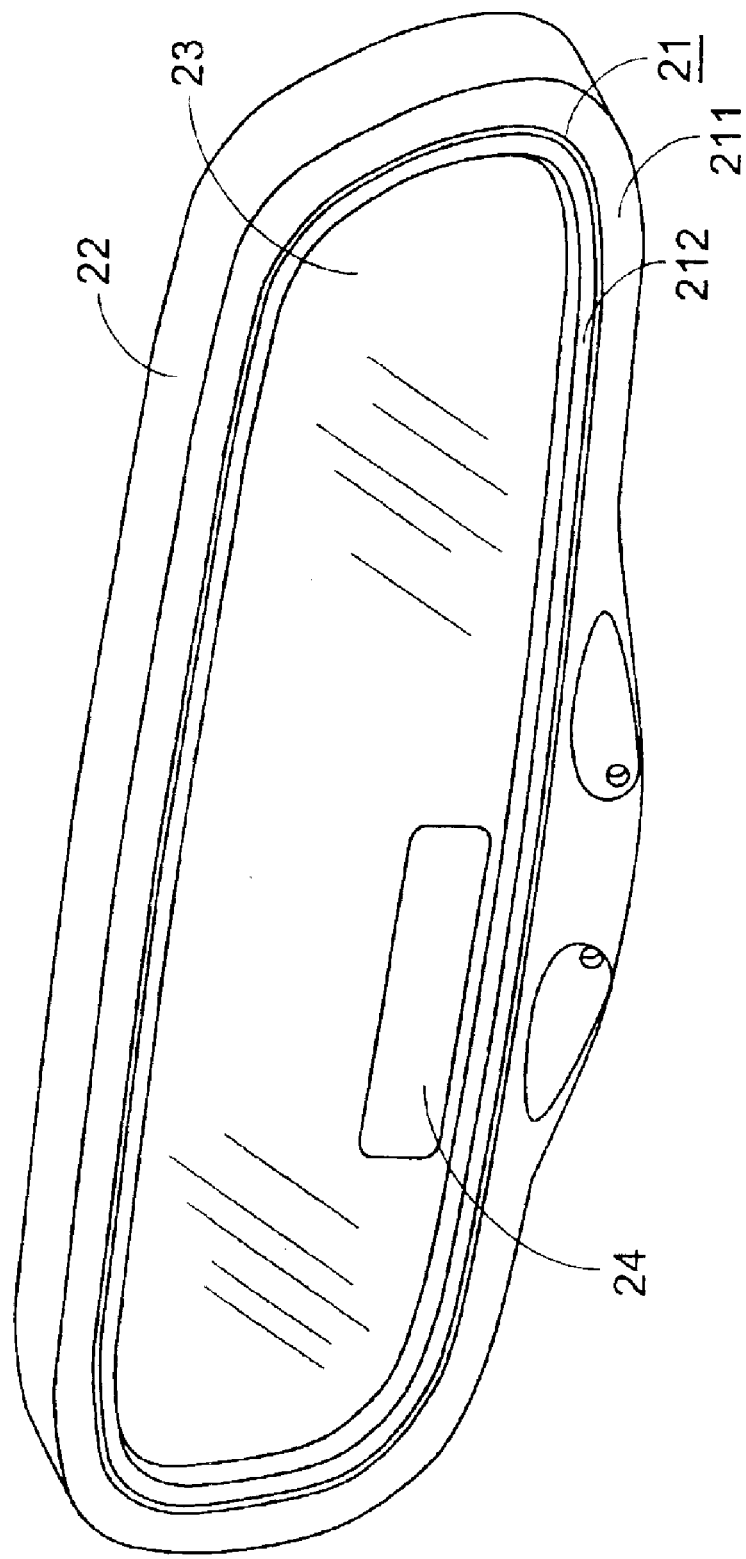
FIG. 2A is a perspective diagram schematically showing a structure of a vehicular rearview mirror according to a preferred embodiment of the present invention.
Figure 2B:
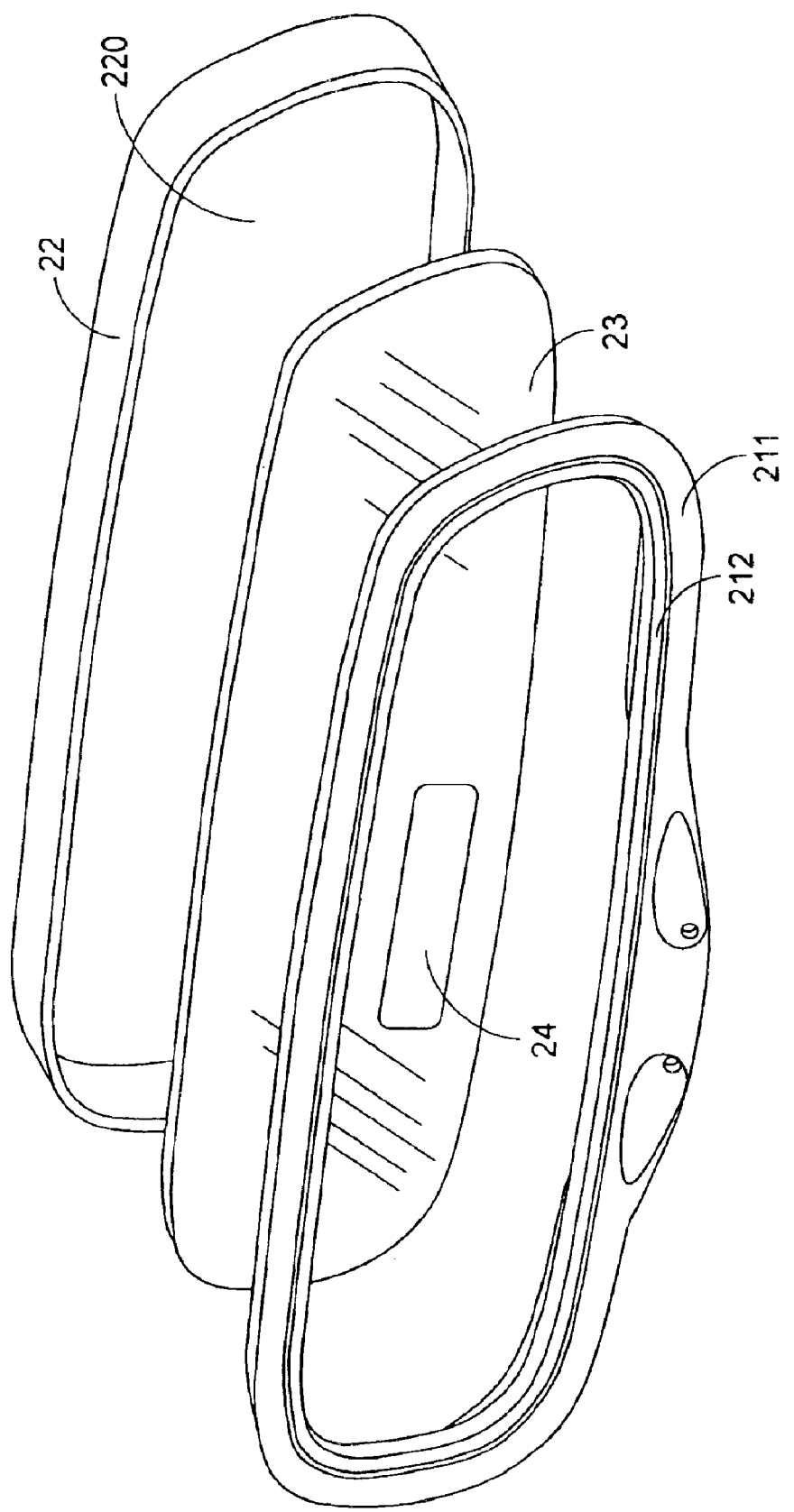
FIG. 2B is a resolving diagram of the rearview mirror structure of FIG. 2A.

Please refer to FIGS. 2A and 2B. An embodiment of a vehicular rearview mirror according to the present invention includes a front housing 21, a rear housing 22 and a mirror 23. When assembling, the mirror 23 is put into the rear housing 22 from an opening 220, and the front housing 21 is put on the top of the mirror 23 and combined with the rear housing 22. The combination of the front housing 21 with the rear housing can be implemented by adhesion, engagement, welding or any other suitable technique, depending on the material of the housings. The material of the rear housing, for example, can be plastic, rubber, resin, metallic material, carbon fiber or wool, depending on practical and decoration considerations. Preferably, the rear housing is made of an engineering plastic such as nylon, PBT, PC, ABS, HI-PS, PP, LCP, PE or PS, magnesium (Mg) alloy, carbon fiber, etc. More preferably, glass fiber can be added into nylon to adjust rigidity of the rear housing when nylon is used as the material.

Figure 3A:
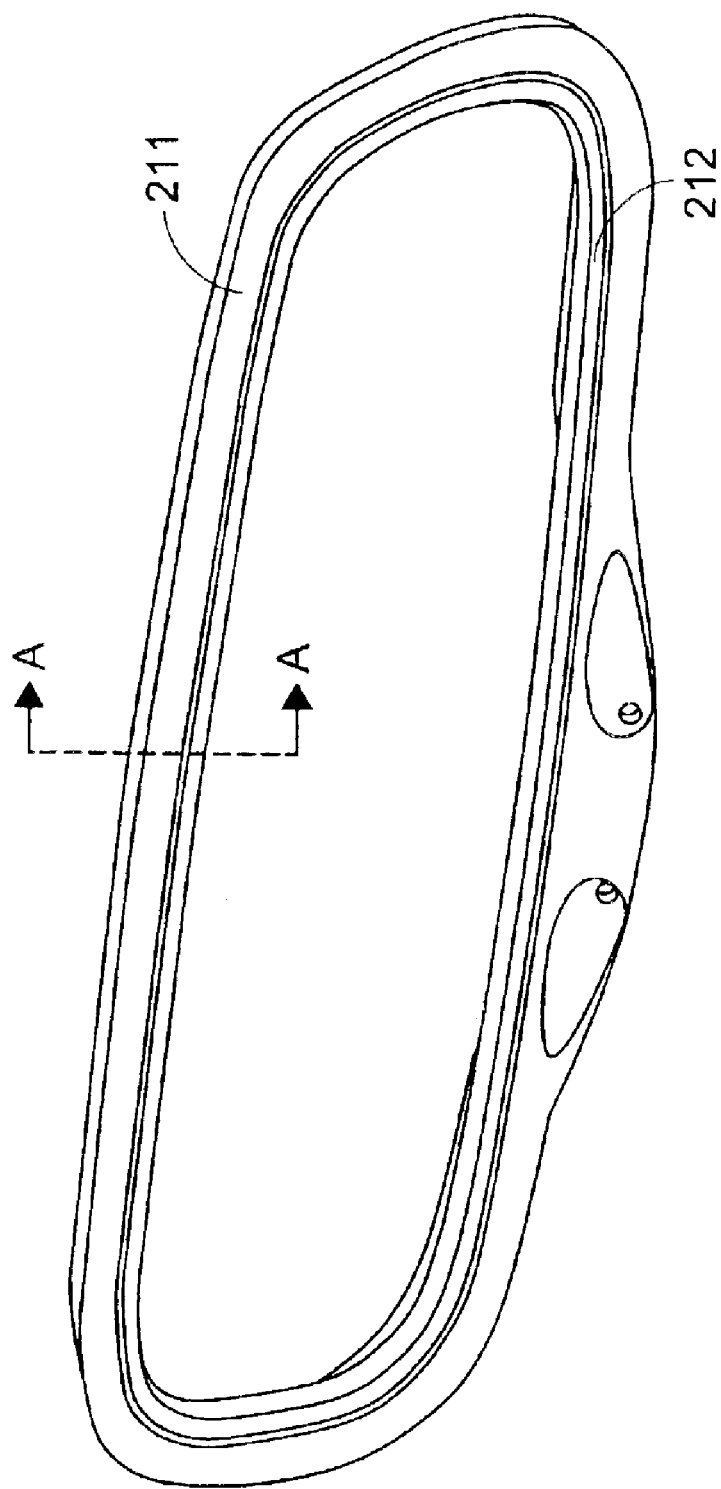
FIG. 3A is a perspective diagram schematically showing an embodiment of the composite front housing structure of the vehicular rearview mirror of FIG. 2.

The front housing 21 is hollow for exposing a portion of the mirror 23 in order to show other cars or objects behind the vehicle on the mirror. As shown in FIG. 3A, the front housing further includes an outer hollow portion 211 and an inner hollow portion 212. The materials for forming the outer hollow portion 211 and the inner hollow portion 212 are different for achieving a special purpose that will be described hereinafter. The material for forming the outer hollow portion 211 is required to be rigid in order to secure the mirror 23 therein. On the other hand, the material for forming the inner hollow portion 212 has a flexibility higher than the material for forming the outer hollow portion 211. The relatively flexible material interfaces the relatively rigid outer portion and the mirror after assembling so that a buffer is provided for the mirror to avoid the above-mentioned problems.

As is known, the relatively flexible material can be made in close contact with the mirror by providing a suitable pressing force without damaging the mirror. By disposing the relatively flexible material between the relatively rigid material, hardly gap is rendered after assembling. Consequently, the impact tolerance is improved. In addition, the elastomeric material itself also facilitates the reduction in impact effect.

For example a rubber or resin is preferred to serve as the relatively flexible material to form the inner hollow portion 212 of the front housing 21. More specifically, the material can be natural rubber, silicone rubber or epoxy resin. Other flexible material can also be applied here as long as it can be formed to be engageable with the outer hollow portion 211 and in close contact with the mirror 23.

The material for forming the outer hollow portion 211, although not necessarily, is preferably the same as that for forming the rear housing 22, e.g. plastic, metallic material, carbon fiber, wood, etc., to facilitate assembling.

Figure 3B:
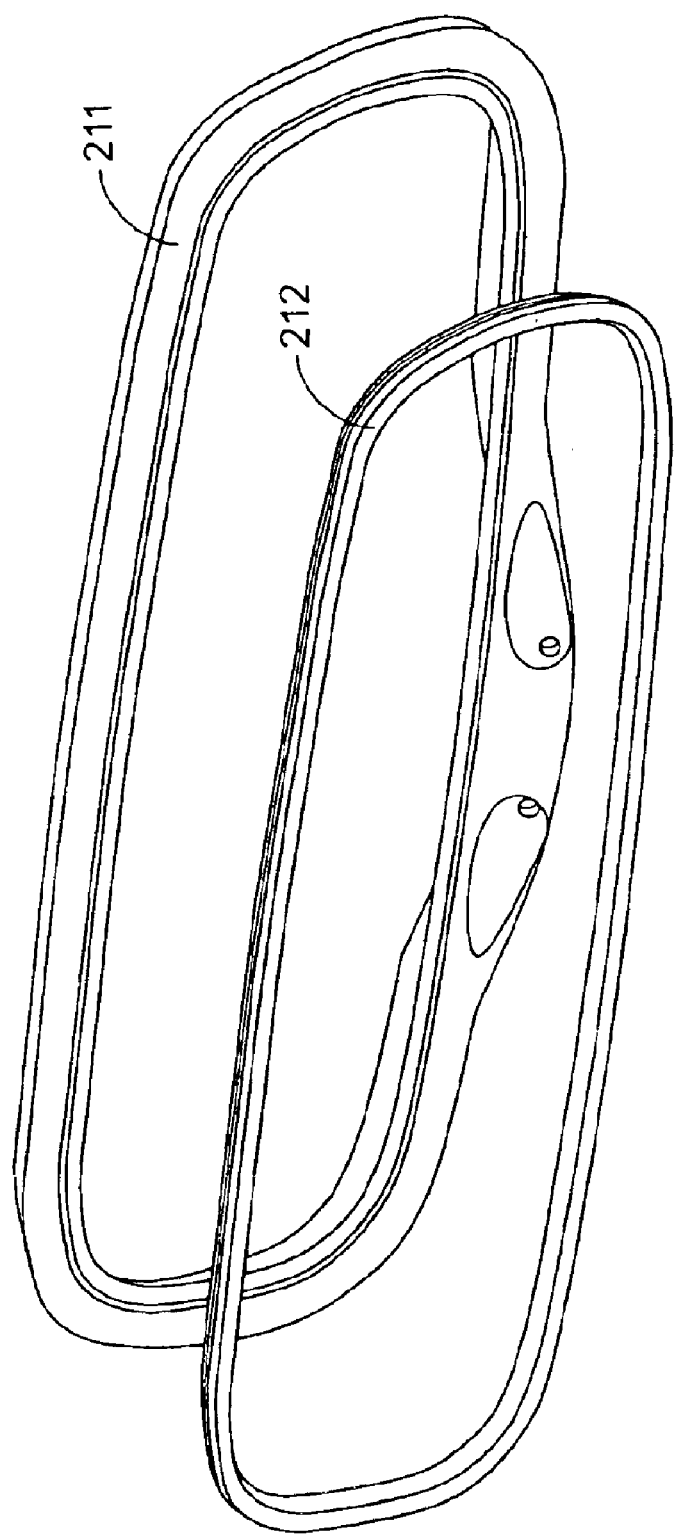
FIG. 3B is a resolving diagram of the composite front housing structure of FIG. 3A.
Figure 4:
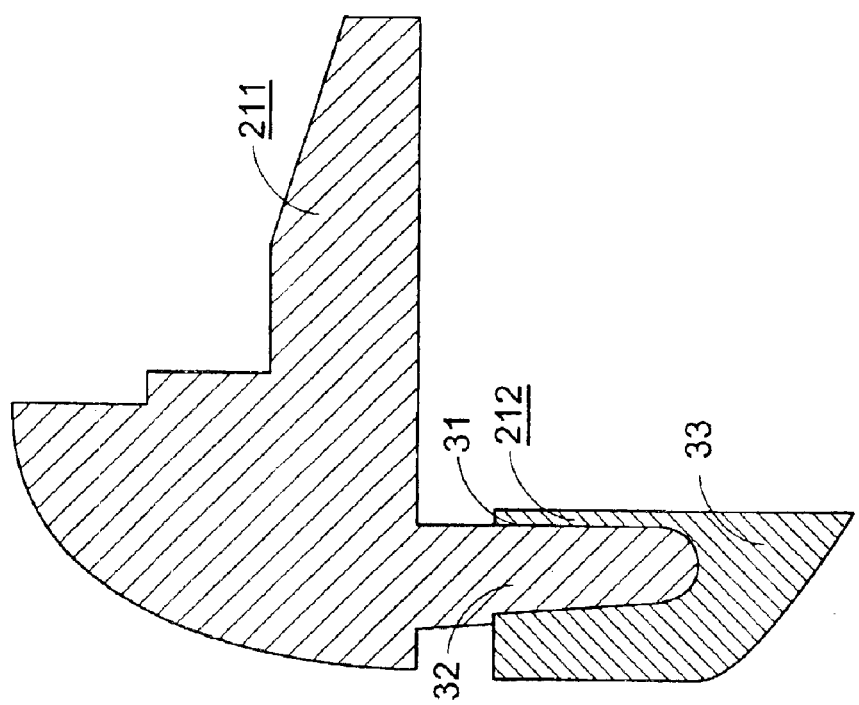
FIG. 4 is a schematic cross-sectional view of the front housing taken along the line A—A of FIG. 3A.

The inner hollow portion 212 can be separately manufactured and then mounted to the outer hollow portion 211 to form the front housing 21, as shown in FIG. 3B. In this embodiment, the inner hollow portion 212 has a slot 31 on an outer circumference thereof for engaging with an inner circumferential edge 32 of the outer hollow portion 211, as shown in FIG. 4 which schematically show the cross-sectional view of the front housing taken along the line A—A of FIG. 3A. The inner hollow portion 212 further has a curved portion 33 on an inner circumference thereof bent toward the mirror 23 for close contact with the mirror. When exerting a pressing force to assemble the rearview mirror, the flexible curved portion 33 will safely sustain against the mirror to result in almost no gap therebetween. When exerting a force to move the housing to adjust the view range, the interfacing flexible material serving as a buffer to avoid the distortion of the mirror.

Alternatively, the inner hollow portion 212 can be made in conjunction with the outer hollow portion 211 by injection molding to the outer hollow portion 211, on the condition that proper materials are used.

Figure 5:
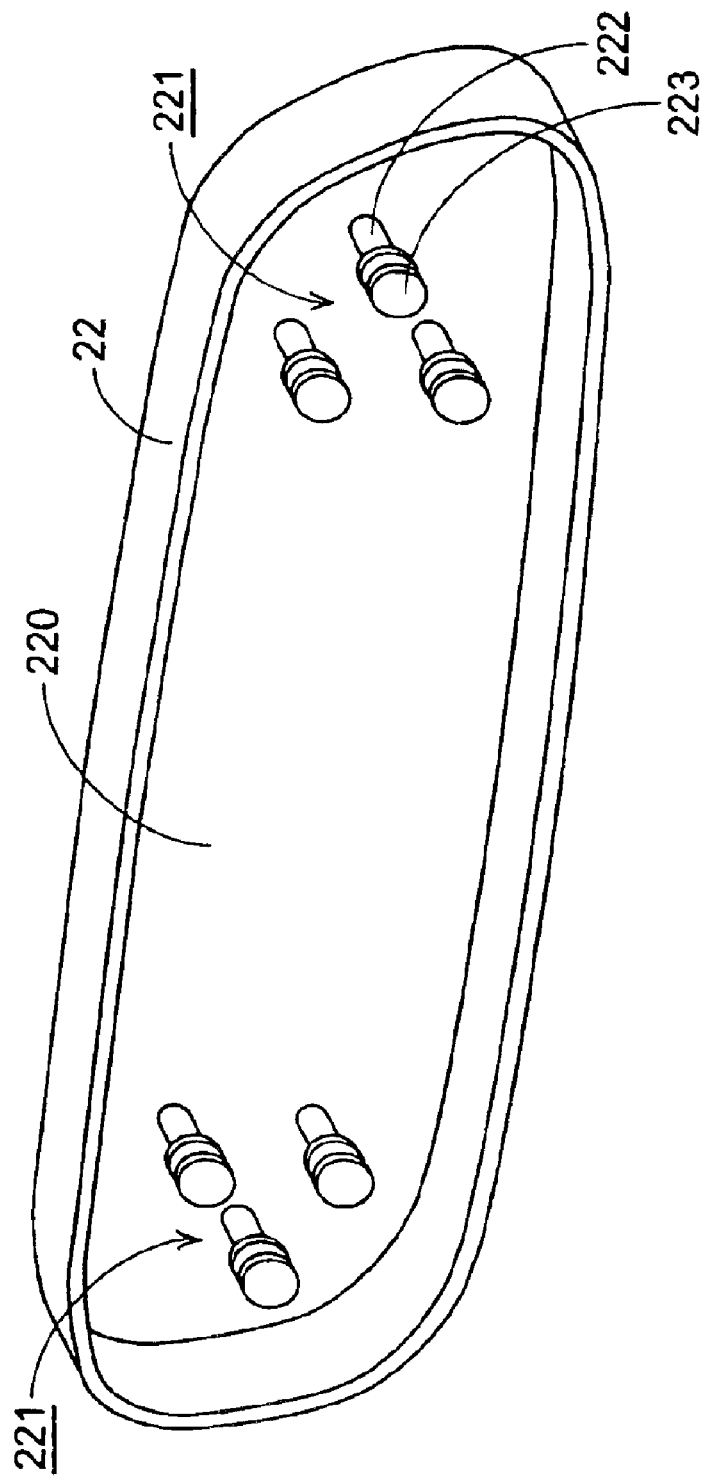
FIG. 5 is a perspective diagram schematically showing an embodiment of the composite rear housing structure of the vehicular rearview mirror of FIG. 2.

The rear housing 22 preferably further provides therein a sustaining force to facilitate the close contact between the mirror 23 and the front housing 21. In order to achieve this purpose, a plurality of buffering posts 221 are disposed in the rear housing 22, as shown in FIG. 5, which flexibly sustains against the back of the mirror 23 when the rearview mirror is assembled. Each of the buffering posts 221 includes a rigid portion 222 and an elastomeric portion 223. The rigid portion 222 provides sufficient support to sustain against the mirror 23, and the elastomeric portion 223 provides sufficient buffer between the mirror 23 and the rigid portion 222. Due to the presence of the buffering posts 221, the mirror 23 is urged to press on the front housing 21 to reduce the gap, while the mirror 23 is also properly buffered to avoid damage. The material for forming the rigid portion 222 is preferably but not necessarily the same as that for forming the rear housing 21, while the material for forming the elastomeric portion 223 is preferably but not necessarily the same as that for forming the inner hollow portion 212. The rigid portion 222 can be integrally formed with the rear housing 21 or mounted to the rear housing 21.

By using different kinds of mirrors, the rearview mirrors according to the present invention may have various functions. For example, in addition to general partially reflective mirror, the mirror can also be an electrochromic mirror, which change color thereof in response to light intensity received thereby in order to eliminate glare effect. The common partially reflective mirror or electrochromic mirror can be combined therewith a thin film display (see FIG. 2B, reference numeral 24) to exhibit enhanced functions. For example, the driving information such as speed, revolving rate, outside image picked up by a vehicular CCD or CMOS camera can be shown on the display for the driver's reference. The thin film display, for example, can be, a light-emitting diode (LED)-, an organic light-emitting diode (OLED), a liquid crystal display (LCD) or a vacuum fluorescent display (VFD). A new trend is to directly use an LCD as the rearview mirror. Anti-glare effect may also be exhibited by the LCD rearview mirror.

The housing structure according to the present invention is suitable to be applied to both of the interior and exterior rearview mirrors. Especially for an exterior mirror having a convex or aspheric (i.e. multi-radius) shape, the presence of the elastomeric inner hollow portion assures of the close conjunction between the housing and the mirror of the assembled rearview mirror.

To sum up, by additionally providing the flexible portion to interface the rigid housing and the fragile mirror, the impact tolerance and distortion tolerance can be improved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A vehicular rearview mirror, comprising:
   a mirror for showing thereon an image;
   a first housing structure made of a first material, and accommodating therein said mirror with a portion of said mirror exposed to show said image;
   a second housing structure made of a second material having a flexibility higher than that of said first material, and disposed between and keeping in contact with said first housing structure and said exposed portion of said mirror, and
   a plurality of buffering posts having a rigid portion protruding from said first housing structure and having an elastomeric portion urging said mirror against said second housing structure for securing said mirror in position.

2. The vehicular rearview mirror according to claim 1 wherein said first housing structure includes a front piece and a rear piece combined with each other to hold said mirror therein.

3. The vehicular rearview mirror according to claim 2 wherein said plurality of buffering posts are disposed on said rear piece.

4. The vehicular rearview mirror according to claim 2 wherein said front piece is of a ring shape for exposing said portion of said mirror.

5. The vehicular rearview mirror according to claim 4 wherein said second housing structure is of a ring shape in conjunction with said front piece of said ring shape.

6. The vehicular rearview mirror according to claim 5 wherein said second housing structure has a slot on an outer circumference thereof for partially receiving said front piece, and a curved portion on an inner circumference thereof for close contact with said portion of said mirror.

7. The vehicular rearview mirror according to claim 4, wherein said second housing structure is formed by injection molding to said front piece.

8. The vehicular rearview mirror according to claim 1 wherein said second material is selected from the group consisting of rubber and resin.

9. The vehicular rearview mirror according to claim 8 wherein said second material is selected from the group consisting of natural rubber, silicone rubber and epoxy resin.

10. The vehicular rearview mirror according to claim 1 wherein said first material is selected from the group consisting of engineering plastic, metallic material, carbon fiber and wood.

11. The vehicular rearview mirror according to claim 1 wherein said mirror is a partially reflective mirror, an electrochromic mirror or a liquid crystal display.

12. The vehicular rearview mirror according to claim 1 wherein said mirror is a planar, a convex or an aspheric mirror.

13. The vehicular rearview mirror according to claim 1 wherein said mirror is combined therewith a thin film display.

14. The vehicular rearview mirror according to claim 13 wherein said thin film display is a thin-film electro-luminescence (EL) digit display, a light-emitting diode (LED), an organic light-emitting diode (OLED), a liquid crystal display (LCD) or a vacuum fluorescent display (VFD).

15. A vehicular rearview mirror, comprising:
   a mirror for showing thereon an image;
   a rear housing structure having an opening for receiving therefrom said mirror;
   a front housing structure combined with said rear housing structure to confine said mirror therebetween, and including an outer hollow portion in conjunction with said rear housing structure made of a first material and an inner hollow portion in contact with said mirror made of a second material, said second material having a flexibility higher than that of said first material; and
   a plurality of buffering posts each having a rigid portion protruding from said rear housing structure and having an elastomeric portion urging said mirror against said inner hollow portion of said front housing structure for securing said mirror in position.

16. The vehicular rearview mirror according to claim 15 wherein said rear housing structure is made of said first material.

17. The vehicular rearview mirror according to claim 16 wherein said first material is selected from the group consisting of engineering plastic, metallic material, carbon fiber and wood.

18. The vehicular rearview mirror according to claim 15 wherein said second material is selected from the group consisting of rubber and resin.

19. The vehicular rearview mirror according to claim 18 wherein said second material is selected from the group consisting of natural rubber, silicone rubber and epoxy resin.

20. The vehicular rearview mirror according to claim 15 wherein said inner hollow portion has a slot on an outer circumference thereof for engaging with an inner circumferential edge of said outer hollow portion.

21. The vehicular rearview mirror according to claim 15 wherein said inner hollow portion has a curved portion on an inner circumference thereof bent toward said mirror for close contact with said mirror.

22. The vehicle rearview mirror according to claim 15 wherein said inner hollow portion is formed by injection molding to said outer hollow portion.

* * * * *